United States Patent [19]

Bartel et al.

[11] Patent Number: 4,969,429
[45] Date of Patent: Nov. 13, 1990

[54] LUBE OIL CONTROL SYSTEM FOR TURBOCHARGED ROTARY PISTON ENGINE

[75] Inventors: John B. Bartel, Greenwood Lake, N.Y.; Arthur Vatsky, Teaneck; Edward F. Drewniany, Oradell, both of N.J.

[73] Assignee: John Deere Technologies International, Inc., Moline, Ill.

[21] Appl. No.: 415,513

[22] Filed: Oct. 2, 1989

[51] Int. Cl.⁵ .............................. F01C 21/04
[52] U.S. Cl. .................... 123/196 R; 418/99
[58] Field of Search ............ 60/605.1; 123/196 R; 418/97, 99

[56] References Cited

U.S. PATENT DOCUMENTS

| | | |
|---|---|---|
| 2,740,394 | 4/1956 | Judson et al. |
| 3,140,700 | 7/1964 | Nallinger |
| 3,639,082 | 2/1972 | Corwin |
| 3,788,782 | 1/1984 | Morgan |
| 3,794,010 | 2/1974 | Palma et al. |
| 3,819,304 | 6/1974 | Demers |
| 3,827,836 | 8/1974 | Scheibe |
| 3,834,843 | 9/1974 | Stoltman et al. |
| 3,841,803 | 10/1974 | Morgan et al. |
| 3,846,052 | 11/1974 | Scheibe |
| 3,886,914 | 6/1975 | Ahrns et al. |
| 4,388,901 | 6/1983 | Kodama et al. |
| 4,765,291 | 8/1988 | Kurio et al. |

FOREIGN PATENT DOCUMENTS 146001 11/1981 Japan ..................... 418/99

Primary Examiner—Michael Koczo

[57] ABSTRACT

A turbocharged rotary internal combustion engine includes engine driven lube oil metering pump which provides controlled lube oil flow to the engine. A pneumatic actuator has a diaphragm exposed to turbo-boost pressure and connected to a control arm of the metering pump so that increase turbo-boost pressure increase the rate of lube oil flow.

5 Claims, 3 Drawing Sheets

LUBE OIL CONTROL SYSTEM FOR TURBOCHARGED ROTARY PISTON ENGINE

BACKGROUND OF THE INVENTION

This invention relates to a lubricating oil metering control system for a rotary engine, and more particularly for lubricating the apex seals of a turbocharged, stratified charge rotary engine with an unthrottled intake.

Various systems for controlling lube oil flow to a rotary engine as a function of engine load and speed have been proposed.

One system is described in U.S. Pat. No.4,765,291 wherein an oil metering pump rate responds to the movement of a diaphragm which is exposed to exhaust gas pressure. However, in such a system various parts would have to be made to withstand the high exhaust temperatures. Futhermore, exhaust gas pressure can vary depending on type and condition of the muffler and exhaust system, and upon whether or not there are leaks in the exhaust system. This leads to the unreliability of a lube oil metering system wherein lube oil is metered as a function of exhaust pressure.

Other systems such as described in U.S. Pat. Nos. 3,788,782, 3,827,836 and 3,834,843 control lube flow rate as a function of at least engine speed and throttle opening. Such schemes will not function in an unthrottled, fuel injected stratified charge rotary engine since there is no throttle. Accordingly, a load dependent lube oil metering system is desired for an unthrottled, stratified charge rotary engine wherein lube oil flow is not dependent upon exhaust gas pressure or subject to high exhaust temperatures.

SUMMARY OF THE INVENTION

An object of the present invention is to provide a lubricating oil metering control system for an unthrottled, stratified charge rotary engine.

Another object of the present invention is to provide such a system which is not dependent upon exhaust gas pressure and which is not subject to high exhaust gas temperatures.

A further object of the present invention is to provide such a system for a multi-unit, multi-turbocharger engine.

These and other objects are achieved by the present invention wherein a turbocharger provides boost air pressure to the intake of an unthrottled, stratified charge rotary combustion engine. An engine driven oil metering pump provides lube oil to a drip orifice in the air intake or to lubricating holes in the rotor housing. The lube oil metering pump includes a pivoting rate control lever. A pneumatic actuator includes a diaphragm exposed to turbo-boost pressure at an outlet of the turbocharger. The diaphragm is connected by a rod to the metering pump control lever so that an increase in turbo boost pressure caused by an increase in engine load moves the diaphragm and rod and pivots the control lever to cause the lube oil metering pump to increase the rate of lube oil flow. In an alternate embodiment, the outlet pressures from multiple turbochargers are combined and communicated to the actuator via a pneumatic OR device.

DETAILED DESCRIPTION

Figure 1:
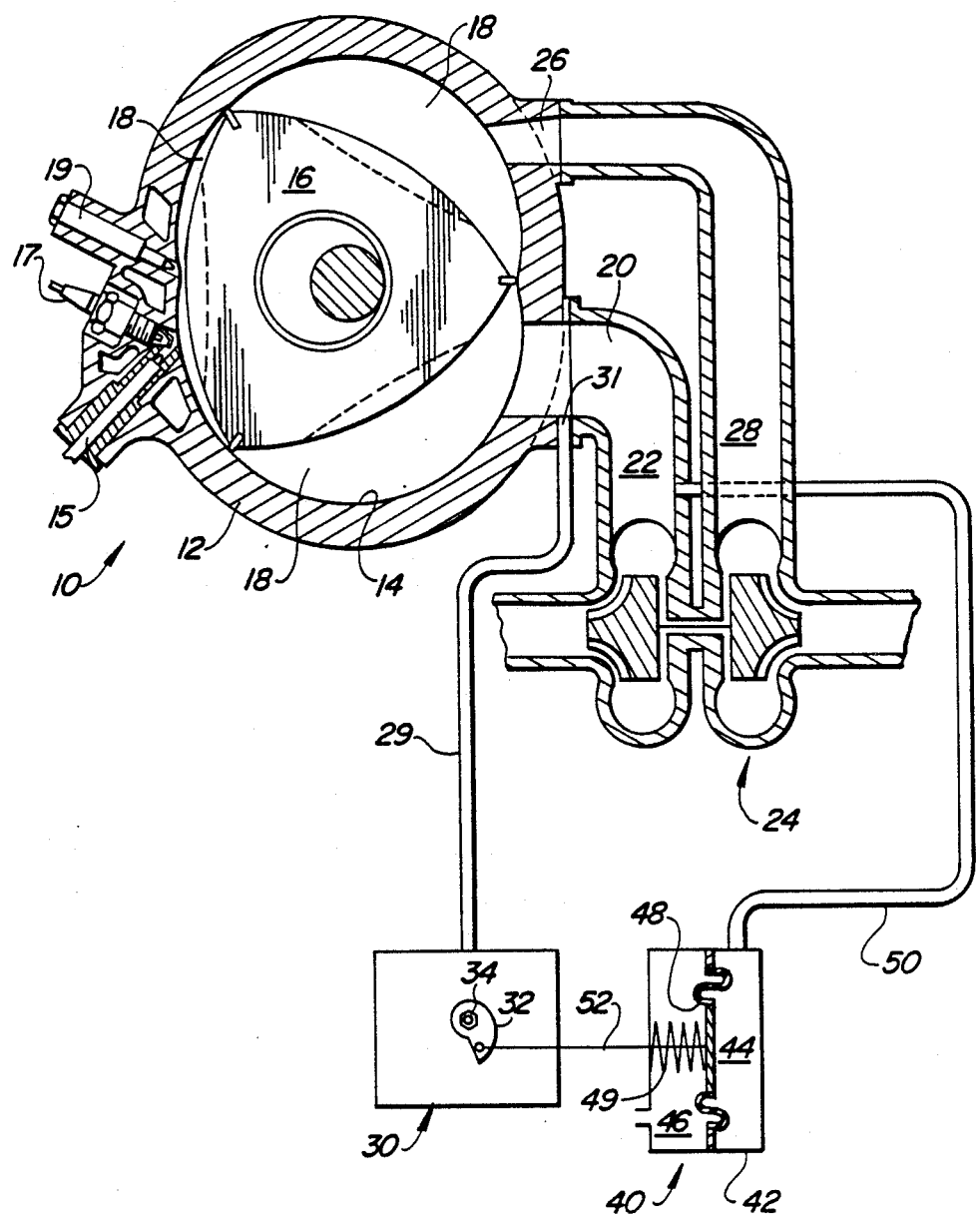
FIG. 1 is a simplified schematic diagram of a rotary engine lube oil metering control system according to the present invention.
Figure 2:
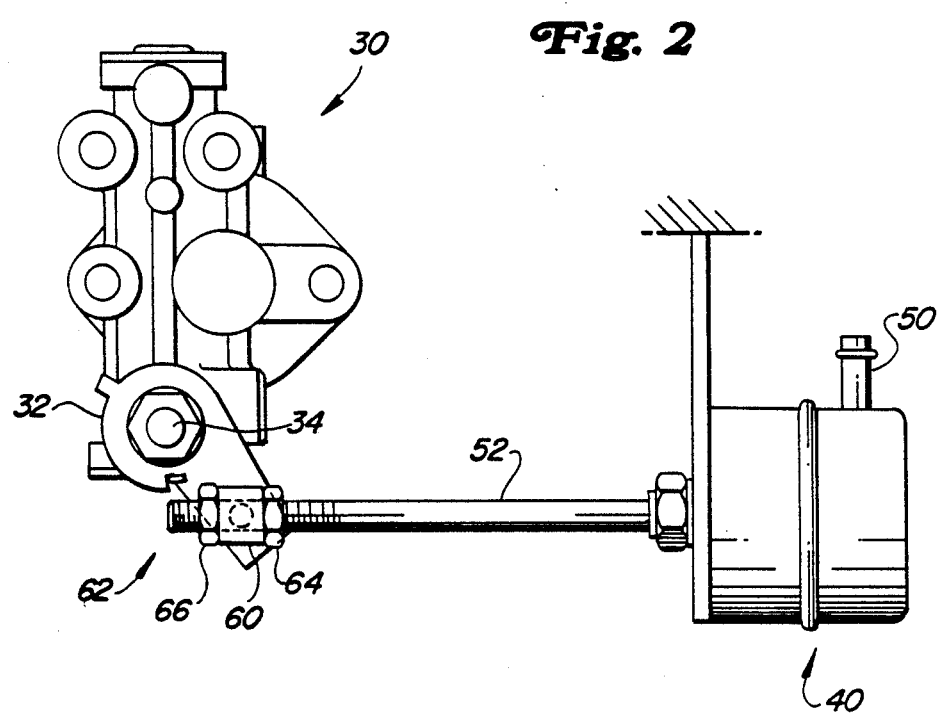
FIG. 2 is a detailed view of a portion of FIG. 1 showing the connection between the diaphragm and the metering pump control lever.

Referring to FIGS. 1 and 2, a rotary engine 10 includes a housing 12 defining a cavity 14 therein which receives a rotor 16 which divides the cavity into a plurality of working chambers 18. An unthrottled intake passage 20 communicates air from an outlet 22 of a turbocharger 24 to the engine 10. An exhaust passage 26 communicates exhaust gasses from the engine to an inlet 28 of the turbocharger 24.

In the top-dead center region of the engine there is located a stratified charge fuel injection and ignition system including a pilot fuel injector 15, an ignition source 17 such as a spark plug and a main injector 19 such as described in U.S. Pat. No. 4,091,789.

An engine driven oil metering pump 30, such as oil pump model No. 3Y2m-119, commercially available from Mikuni American Corporation, provides lube oil via line 29 to a drip feed orifice 31 in the air intake 20. The rate of lube oil flow is controlled by the arm 32 which rotates around a pivot 34. A torsion spring (not shown) biases the lever counter-clockwise, as in the known, commercial oil pump.

A pneumatic actuator 40 includes a housing 42 dived into a pair of chambers 44 and 46 by a movable diaphragm 48. Conduit 50 communicates turbo-boost pressure from the outlet 22 of turbocharger 24 to chamber 44. A rod or link 52 connects diaphragm 48 to lever 32 so that increases in engine load and turbo-boost pressure moves diaphragm 48 and rod 52 to the right to pivot lever 32 and increase the rate of lube flow to lube orifice 31. A spring 49 is biased to urge diaphragm 48 away from lever 32. It should be noted that this FIG. 1 embodiment could be applied to the case of a multi-rotor, single turbocharger system.

Referring now to FIG. 2, the arm 32 is pivotally pinned to an element or hollow sleeve 60 which is mounted on a threaded portion 62 of the rod 52 between a pair of adjustment nuts 64 and 66.

Figure 3:
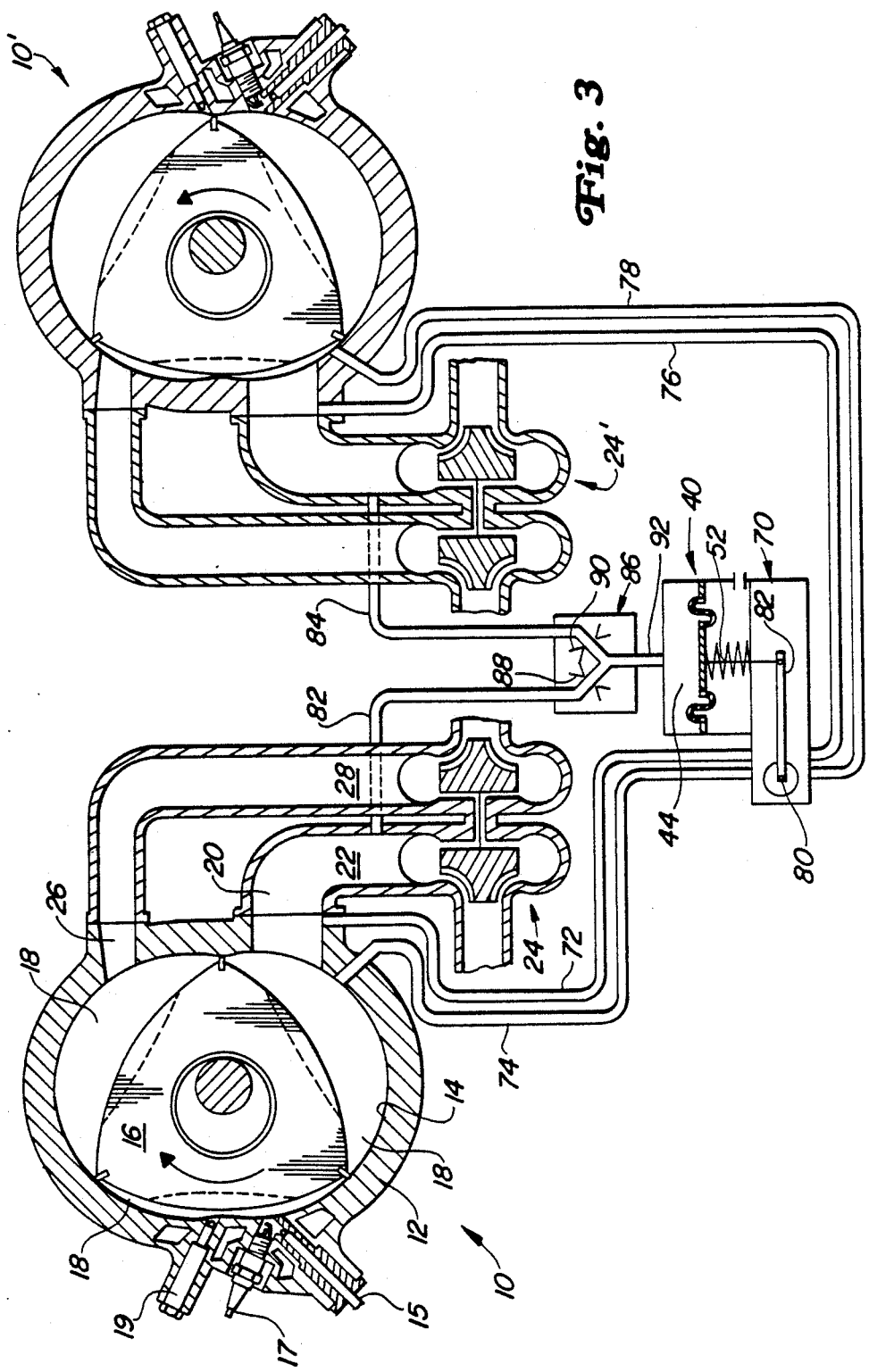
FIG. 3 is a simplified schematic diagram of an alternate embodiment of the present invention.

Referring now to FIG. 3, there is shown a system including multiple engine units 10, 10', each unit having a separate turbocharger 24, 24', connected thereto. An engine driven oiler 70, such as the control components of a commercially available "PG" series locomotive oiler made by Woodward Governor Co., supplies lube oil via lines 72, 74, 76 and 78 to two locations for each engine unit 10, 10'. The rate of lube oil flow is controlled by the rotation of an input sleeve 80.

The link 52 of pneumatic actuator 40 is pivotally connected to arm 81 which is non-rotatably connected to sleeve 80. Conduits 82 and 84 communicate turbo-boost pressure from the outlet of each turbocharger 24, 24' to a pneumatic device 86 which is the pneumatic analog to an electronic OR circuit. Within pneumatic device 86 each conduit 82, 84 passes through a restriction, 88, 90, and then are joined to form conduit 92 which is connected to the inlet of actuator 40. In this manner, the out-of-phase, cyclical, time-varying pressures from the separate turbochargers 24, 24' are combined into a substantially non-cyclical pressure which varies as engine load varies. If one turbocharger stops functioning, a slightly reduced, but still substantially non-cyclical pressure from the other turbocharger will still be communicated to the chamber 44 of the actuator 40.

While the invention has been described in conjunction with a specific embodiment, it is to be understood that many alternatives, modifications and variations will be apparent to those skilled in the art in light of the aforegoing description. For example, the oil metering pump could be replaced by an oil metering valve (not shown) which would receive pressurized lube oil from a separate pump (not shown) and which would control the delivery of lube oil to the engine as a function of engine speed and at least one other input. In this case, the linear motion of the link 52 could be converted to rotary motion or whatever is required by the input of such an oil metering valve. Accordingly, this invention is intended to embrace all such alternatives, modifications and variations which fall within the spirit and scope of the appended claims.

What is claimed:

1. In rotary piston engine having a housing defining a rotor cavity, a rotor movable in the cavity and defining working chambers therein, a lube orifice for communicating lube oil to the engine, an unthrottled intake passage for supplying intake air to the working chambers, an exhaust passage for receiving exhaust gasses from the working chambers and a turbocharger powered by the exhaust gasses and having an outlet supplying air at a boost pressure to the intake passage, an engine lubricating system comprising:
    a pneumatic actuator having a housing containing a pressure responsive member defining a pressure chamber therein;
    a means for communicating pressurized air from the outlet of the turbocharger to the pressure chamber;
    a resilient member coupled to the pressure responsive member to resist movement of the pressure responsive member resulting from increases in pressure in the pressure chamber;
    means for providing to the lube orifice an amount of lube oil controlled as a function of engine speed and as a function of an input control member; and
    a link coupling the pressure responsive member to the control member so that lube oil flow rate increases as the boost pressure in the turbocharger outlet increases.

2. The invention of claim 1, wherein:
    the link comprises adjustment means for adjusting the coupling between the control member and the link.

3. The invention of claim 2, wherein:
    the link comprises a rod with a threaded end;
    a hollow sleeve is mounted on the threaded end and coupled to the control arm; and
    a pair of threaded adjusting nuts are screwed into the threaded rod end on opposite sides of the hollow sleeve.

4. The invention of claim 1, wherein:
    the engine comprises a multi-unit engine having a plurality of rotors and having a plurality of turbochargers, each turbocharger being connected to at least one of the engine units; the means for communicating comprises a plurality of sensing conduits, each having a first end exposed to pressure in an outlet of a corresponding one of the turbochargers and a second end, and a pneumatic OR device comprising a housing having plurality of inlets, each inlet connected to a second end of a corresponding one of the sensing conduits, the housing having a corresponding plurality of inlet passages which are joined to form a single outlet passage, each inlet passage communicating with a corresponding one of the inlets, and an outlet for communicating the outlet passage with the pressure chamber of the pneumatic actuator; and
    the lube oil providing means including means for communicating lube oil to each of the engine units.

5. The invention of claim 4, wherein:
    each inlet passage of the pneumatic OR device passes through a restriction.

* * * * *